United States Patent [19]
Smith

[11] 3,774,375
[45] Nov. 27, 1973

[54] POCKET TYPE FILTER
[75] Inventor: Tom R. Smith, Lousiville, Ky.
[73] Assignee: American Air Filter Company, Inc., Louisville, Ky.
[22] Filed: Nov. 19, 1971
[21] Appl. No.: 200,298

[52] U.S. Cl. .................... 55/382, 55/483, 55/528
[51] Int. Cl. ............................. B01d 46/02
[58] Field of Search ............... 55/381, 341, 382, 55/483, 484, 497–500, 524, 528, 486, 487

[56] References Cited
UNITED STATES PATENTS
2,278,502  4/1942  Waters ........................ 156/306
3,273,321  9/1966  Bauder et al. ................. 55/341
3,400,519  9/1968  Korn ........................... 55/484
3,422,602  1/1969  Janson ......................... 55/378
3,479,803  11/1969 Smith .......................... 55/484
3,675,403  7/1972  Ruffo .......................... 55/524

Primary Examiner—Bernard Nozick
Attorney—Robert W. Fletcher et al.

[57] ABSTRACT

An improved pocket type fluid filter, the pockets of the filter being fabricated from a fluid permeable batt-scrim laminate joined together by heat seals.

4 Claims, 4 Drawing Figures

Patented Nov. 27, 1973 3,774,375

POCKET TYPE FILTER

BACKGROUND OF THE INVENTION

The present invention pertains to the fluid filtration art and is particularly applicable to the gas separation art, wherein particulate material is separated from a gaseous stream. Various types of pocket fluid filters are known in this art. The material used in fabricating the pockets of such pocket fluid filters may be stiff and self-supporting in nature, or it may be soft and flexible. For example, pockets may be made of cloth, spun fibers or batt materials. Such pockets are, however, less porous and are limited in their dust holding capacity, compared to self-supporting pockets. They are also more vulnerable to rupture. Pocket type fluid filters having pockets of a soft flexible material are also easier to handle and store; however, two problems deter their use. First, soft flexible materials are somewhat difficult to seal together to form gas pervious pockets, and second, the pockets tend to easily separate or rupture during the filtering operation. The present invention provides a method of sealing such soft flexible materials, such as cloth, spun fibers or batt materials, utilizing a heat seal which is effective in eliminating these problems.

SUMMARY OF THE INVENTION

The present invention is a new, useful, and unobvious pocket type filter, the pockets of which are sheets of soft, pliant, flexible batt-scrim laminate heat sealed together. These heat seals positively seal the batt material together and also prevent fluid leakage through the seal. More specifically the present invention provides a pocket type fluid filler comprising two approximately equal sized sections of a fluid permeable batt-scrim laminate; a heat seal joining the sections of laminate together in facing relationship along a portion of their outer peripheries, the remaining portion of their outer peripheries forming open upstream entrance means, the heat seal being comprised along the area of seal of a fluid impermeable scrim-impregnated batt portion and, in contiguous abutting relation therewith, a fluid-impervious scrim portion, the seal being effective to secure the outer peripheries of the laminate sections together in a fluid impervious seam and prevent fluid leakage therethrough; and selectively spaced fluid impervious seams forming a plurality of parallel pockets in each of the sealed sections of batt-scrim laminate, the seams being essentially normal to the entrance means, and extending a major portion of the distance from the downstream most juncture of the sections toward the entrance means. Terminal support means is attached to the open upstream entrance means to define a plurality of upstream mouth portions. One such mouth portion corresponds to each of the parallel pockets.

The pocket type fluid filter of the present invention has been found to be very effective in maintaining a constant shape during the filtering operation, and is straightforward, inexpensive, readily constructed and easily maintained. It has further been found to be very effective in withstanding the strain of continuous operation. Such continuous operation, of course, demands that the batt-scrim laminate be positively sealed with a fluid impervious seal. Such a seal has been provided as will hereinafter be described.

DESCRIPTION OF THE PREFERRED EMBODIMENT

Figure 1:
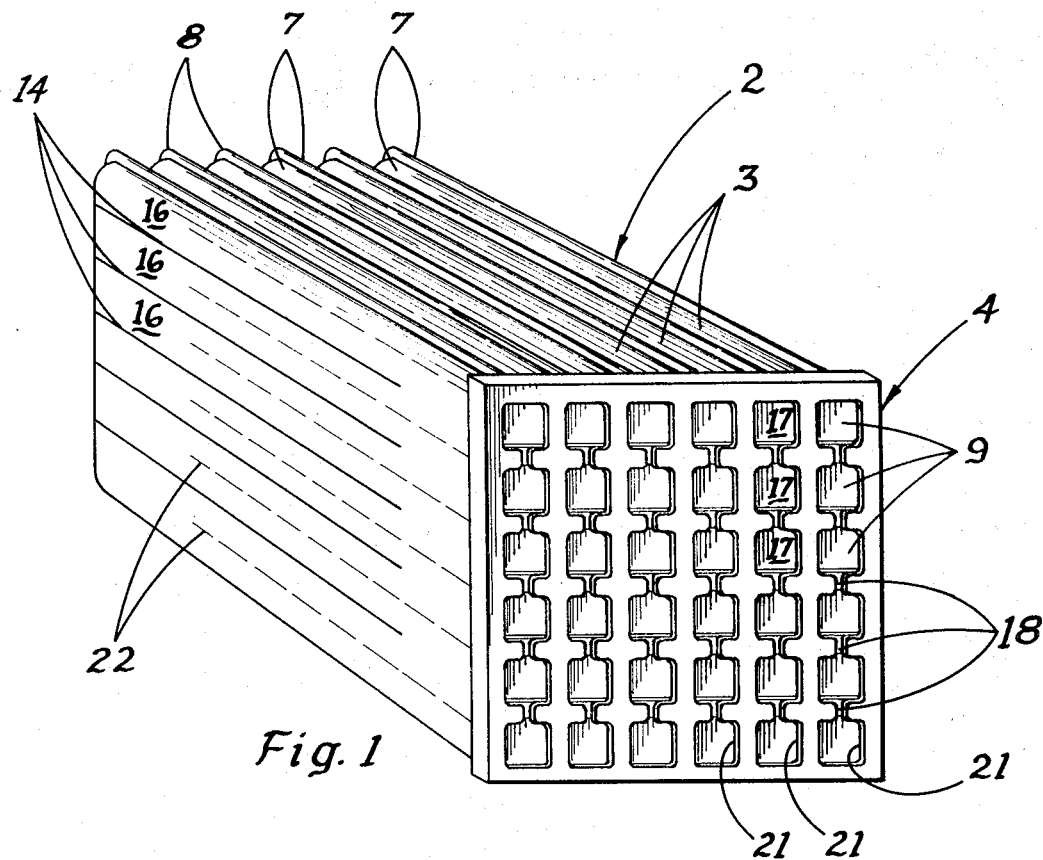
FIG. 1 is a perspective view of the pocket type fluid filter apparatus of the present invention.

FIG. 1 shows a pocket type fluid filter apparatus 2 having a terminal support means 4 and a plurality of pockets 3 connected thereto. The pockets can be formed from any of a number of soft pliant flexible filtering materials which are laminated with a heat sealable scrim material. Such heat sealable scrim material 6 (FIG. 2) can be, for example, polyesters, nylon, polypropylene, and polyethlene, or any other heat sealable thermoplastic resinuous material. Advantageously, a non-woven heat sealable fibrous material is used. Specifically, a non-woven, fire retardant, heat sealable polyester has been found to be quite satisfactory.

Figure 2:
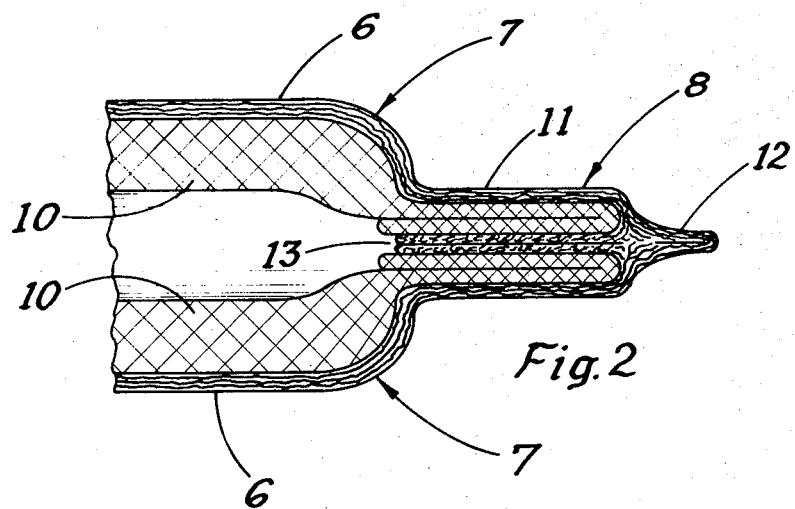
FIG. 2 is an enlarged cross-sectional view of the heat seal of this invention.
Figure 3:
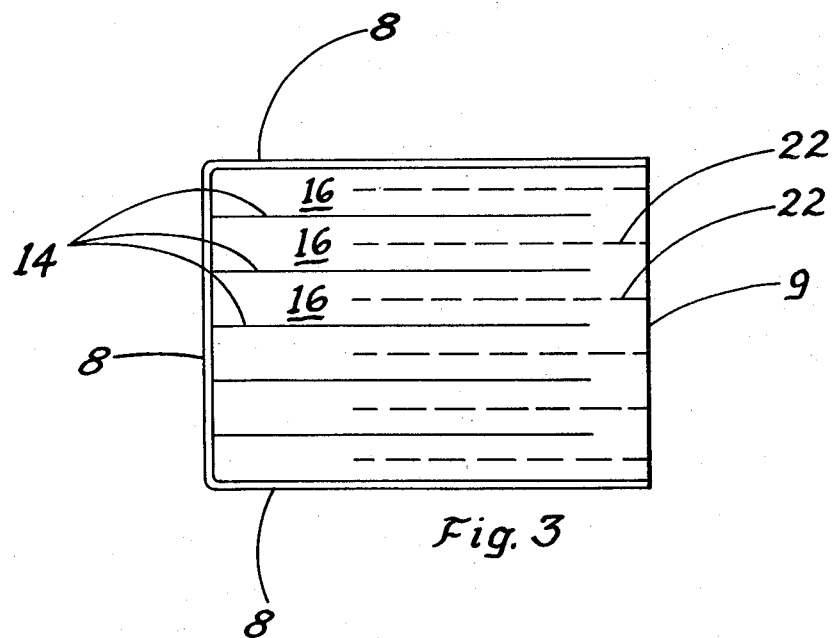
FIG. 3 is a diminished side view showing the pockets formed in the sections of fluid-permeable batt-scrim laminate.

The first step in forming pockets 3 is to join two approximately equal sized sections 7 of fluid permeable batt-scrim laminate. Such a batt-scrim laminate, having a batt portion 10 and a scrim portion 6, is shown in FIG. 2. The sheets of laminate are heat sealed to join them along a major portion of their outer peripheries. The remaining portion of the outer peripheries of sections 7 comprise open upstream entrance means 9. Each of the heat seals 8 is comprised of a fluid impermeable scrim impregnated batt portion 11, and in contiguous abutting relationship therewith, fluid impervious scrim portion 12. Heat seals 8 are fabricated by folding the peripheries of sections 7 inwardly, and then aligning sections 7 with their batt portions 10 in face to face abutting relationship. The peripheries are then heated and compressed to simultaneously form both fluid impermeable scrim impregnated batt portion 11 and fluid impervious scrim portion 12. The heat applied during the heating operation causes the previously porous scrim material to become impervious at the area of heating thus formation of the fluid-impervious scrim-impregnated batt portion and the fluid impervious scrim portion is effected.

Figure 4:
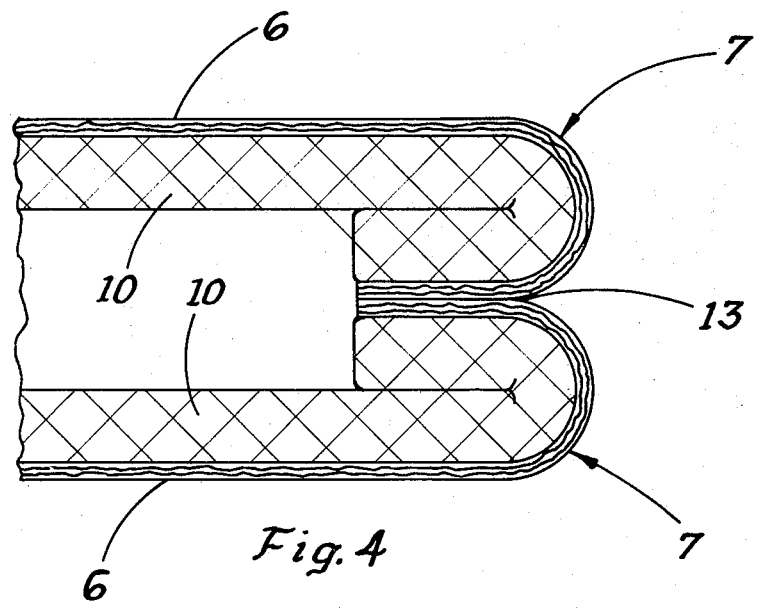
FIG. 4 is an enlarged cross-sectional view of the edges of the batt-scrim laminate folded as in the seal of FIG. 2, but before heat and pressure are applied.

The most preferred method of forming such a seal is to place sectons 7 in face to face abutting relationship so that the batt portions 10 of sections 7 are touching each other, and the scrim portions 6 are opposite each other. Then both respective section peripheries are folded inwardly to bring a segment of the scrim portions 6 into abutting relationship, as shown at 13 in FIG. 4. These inwardly folded peripheries are then placed between heated platens and pressure is applied. A portion of the scrim is melted and forced laterally between the platens to form fluid impervious scrim portion 12 at such platens. The remainder of the melted scrim is impregnated into the batt portion of the seal from the center out and from the outside in. The scrim impregnated batt portion is comprised of four layers of laminate and four layers of scrim, thus, there is an adequate supply of heat sealable material at the seal area to impregnate and secure the batt portions together. Alternatively formation of heat seal 8 can be accomplished using a sonic heat sealing apparatus to supply the required heat and pressure.

It should be noted that heat seal 8 is particularly unique in that if excessive internal pressure forces batt portions 11 apart, at 13 of FIG. 2, fluid-impervious scrim portion 12 will remain and will not allow fluid to pass therethrough. Thus, impervious scrim portion 12 acts as a fail-safe feature in addition to functioning as part of the seal.

The formation of the plurality of pockets 3 is completed by fluid impervious seams 14 which extend essentially normal to the terminal support means 4 from the downstream most juncture of sections 7 to divide sections 7 into rows of side by side pockets 16. Seams 14 attach the two abutting batt-scrim laminate sections to each other. Such seams can be formed by stitching or by sonically heat sealing the batt-scrim laminate at selected intervals. Each pocket has an open end mouth portion cooperating with an air inlet passage 17 of terminal support means 4. Terminal support means 4 supports the plurality of pockets across a fluid stream to be filtered.

Terminal support means 4 can be formed from a suitable sheet material by conventional stamping or drawing methods, or alternatively, it can be formed from several pieces of rigid material fastened together. Such fastening can be accomplished by welding or bolting or the like. Terminal support means 4 includes spaced parallel longitudinally extending members each having a plurality of successively opposed crests and valleys. Inlet passages 17 are then defined by spaced bars 18. Projecting inwardly around the periphery of each passage 17 is sidewall 21. Each sidewall 21 supports in part one of opposed sections 7. Such support is provided by suitable means, for example gluing sections 7 to sidewall 21.

To insure proper contouring of each of pockets 3 during filtering operations a heat sealed compressed indention line 22 is provided in each of the faced sections of fluid permeable batt-scrim laminate. Compressed line 22 extends substantially parallel to spaced pocket forming seams 14 from the mouth along a portion of the laminate sheet. The pockets 3 assume a configuration which includes a bend at compressed line 22 during the fluid treating operation. Pockets 3 are spaced from each other in preselected fashion to provide maximum filtering efficiency with a minimum of contact between adjacent pockets.

Although the invention has been shown in the Figures as being fabricated from two sheets of laminate heat sealed together, the invention also comprises the use of a single larger sheet folded to form two smaller opposed sections which are then heat sealed along their abutting two sides adjacent the fold.

Having defined the invention what is claimed is:

1. A pocket type fluid filter comprising: two approximately equal sized sections of a fibrous fluid-permeable batt-scrim laminate, said scrim portion of said laminate being a thermoplastic material; a heat seal joining said sections of laminate together in facing relationship along their abutting outer side peripheries and closed at one end to define a pocket filter, said outer side peripheries being folded over upon themselves to form four layers of batt scrim laminate, the remaining portion of their outer peripheries forming an open upstream entrance means, said heat seal being comprised of two portions: (1) a fluid impermeable scrim-impregnated batt portion, and contiguous thereto, (2) a fluid impervious thermoplastic portion defining the outer extremity of said seal, said heat seal being effective to secure the outer peripheries of said laminate sections together in a fluid impervious seam and prevent fluid leakage therethrough; and selectively spaced fluid impervious seams forming a plurality of parallel pockets joining said sections of batt scrim laminate, said seams being essentially normal to said entrance means and extending a major portion of the distance from the downstream most juncture of said sections toward said entrance means.

2. The fluid filter of claim 1 wherein terminal support means is attached to said open upstream entrance means of said heat sealed sections to define a plurality of upstream pocket mouth portions, one such mouth portion corresponding to each of said parallel pockets.

3. The pocket type fluid filter of claim 1 wherein said scrim impregnated batt portion of said heat seal is fabricated from four layers of laminate and four layers of scrim.

4. The pocket type fluid filter of claim 1 wherein said selectively spaced seams comprise sonically heat-sealed segments spaced at selected intervals.

* * * * *